United States Patent
Beidl et al.

(10) Patent No.: US 10,089,627 B2
(45) Date of Patent: Oct. 2, 2018

(54) CRYPTOGRAPHIC AUTHENTICATION AND IDENTIFICATION METHOD USING REAL-TIME ENCRYPTION

(71) Applicant: FINALOGIC BUSINESS TECHNOLOGIES GmbH, Wein (AT)

(72) Inventors: Heinrich Beidl, Vienna (AT); Erwin Hrdy, Deutsch-Wagram (AT); Julius Schauerhuber, Absdorf (AT)

(73) Assignee: FINALOGIC BUSINESS TECHNOLOGIES GmbH, Vienna (AT)

( * ) Notice: Subject to any disclaimer, the term of this patent is extended or adjusted under 35 U.S.C. 154(b) by 821 days.

(21) Appl. No.: 14/376,077

(22) PCT Filed: Jan. 28, 2013

(86) PCT No.: PCT/AT2013/000013
§ 371 (c)(1),
(2) Date: Jul. 31, 2014

(87) PCT Pub. No.: WO2013/113050
PCT Pub. Date: Aug. 8, 2013

(65) Prior Publication Data
US 2015/0006404 A1   Jan. 1, 2015

(30) Foreign Application Priority Data

Jan. 31, 2012   (AT) .................. A 131/3012

(51) Int. Cl.
*G06F 21/00*   (2013.01)
*H04L 29/06*   (2006.01)
(Continued)

(52) U.S. Cl.
CPC ..... *G06Q 20/4012* (2013.01); *G06Q 20/3829* (2013.01); *H04L 9/0822* (2013.01);
(Continued)

(58) Field of Classification Search
CPC .......... G06Q 20/4012; G06Q 20/3829; G06Q 2220/00; H04L 9/14; H04L 9/3263;
(Continued)

(56) References Cited

U.S. PATENT DOCUMENTS

2002/0059146 A1   5/2002   Keech
2003/0182558 A1   9/2003   Lazzaro
(Continued)

FOREIGN PATENT DOCUMENTS

AT   504634   6/2008
EP   1122930 A2 *   8/2001   ........... H04L 9/0822
(Continued)

OTHER PUBLICATIONS

Xavier Boyen, Qixiang Mei, Brent Waters; "Direct chosen ciphertext security from identity-based techniques"; Nov. 2005; CCS '05: Proceedings of the 12th ACM conference on Computer and communications security; Publisher: ACM; pp. 320-329.*
(Continued)

*Primary Examiner* — Kendall Dolly
*Assistant Examiner* — Courtney Fields
(74) *Attorney, Agent, or Firm* — Cozen O'Connor

(57) ABSTRACT

A method for securing data and safeguarding its origin, in which the data are transmitted from a customer device to a center in an encrypted manner using digital keys and certificates. The encryption includes the steps of generating several key pairs at a center and transmitting keys, key-encrypted keys, and encrypted data to a customer device. The customer device is afterwards able to transmit data encrypted by a safe key to the center. The data may be a PIN code.

9 Claims, 3 Drawing Sheets

(51) Int. Cl.
*H04L 9/08* (2006.01)
*H04L 9/32* (2006.01)
*G06Q 20/40* (2012.01)
*G06Q 20/38* (2012.01)
*H04L 9/14* (2006.01)

(52) U.S. Cl.
CPC .............. *H04L 9/0825* (2013.01); *H04L 9/14* (2013.01); *H04L 9/3226* (2013.01); *H04L 9/3263* (2013.01); *H04L 63/062* (2013.01); *H04L 63/0823* (2013.01); *G06Q 2220/00* (2013.01); *H04L 2209/24* (2013.01); *H04L 2463/062* (2013.01)

(58) Field of Classification Search
CPC ... H04L 9/0825; H04L 9/3226; H04L 9/0822; H04L 63/062; H04L 63/0823; H04L 2209/24; H04L 2463/062

See application file for complete search history.

(56) References Cited

U.S. PATENT DOCUMENTS

| | | | |
|---|---|---|---|
| 2004/0168055 A1* | 8/2004 | Lord | H04L 63/0823 713/156 |
| 2008/0298588 A1 | 12/2008 | Shakkarwar | |
| 2009/0271616 A1 | 10/2009 | Hostädter | |
| 2012/0254609 A1 | 10/2012 | Hostädter | |
| 2012/0311322 A1* | 12/2012 | Koyun | G06Q 20/3227 713/156 |

FOREIGN PATENT DOCUMENTS

| | | |
|---|---|---|
| GB | 2 457 367 | 8/2009 |
| WO | WO 02/47356 | 6/2002 |
| WO | WO 2008/076442 | 6/2008 |
| WO | WO 2008/151209 | 12/2008 |

OTHER PUBLICATIONS

D. Natale et al., "A Reliable Architecture for the Advanced Encryption Standards", Proceedings 13$^{th}$ IEEE European Test Symposium—ETS 2008, pp. 13-18, XP031281076, May 25, 2008.

* cited by examiner

CRYPTOGRAPHIC AUTHENTICATION AND IDENTIFICATION METHOD USING REAL-TIME ENCRYPTION

RELATED APPLICATIONS

This is a U.S. National stage of International application No. PCT/JP2013/000013 filed on Jan. 28, 2013.

This patent application claims the priority of Austrian application no. A 131/2012 filed Jan. 31, 2012, the disclosure content of which is hereby incorporated by reference.

FIELD OF THE INVENTION

The invention relates to a method for securing data and safeguarding its origin, in which the data are transmitted from a customer device to a center in an electronically encrypted manner.

BACKGROUND OF THE INVENTION

In the prior art, methods for securing transmission of electronic data with the aid of digital encryption techniques are known.

US Patent Application 2002/059146 A1 shows a method for identifying a user and for secure transmission of numerical codes. In it, a transaction code is used by encryption of a random number with the user's PIN, which is known only to the user and a center. It is disadvantageous here that the fact that the PIN could be surreptitiously viewed threatens the security of this method.

Austrian Patent Disclosure AT 504 634 B1 and International Patent Disclosure WO 2008 151 209 A1, also published as US Patent Application 2008/298588 A1, disclose methods for transferring encrypted messages. In these methods, by alternatingly using symmetrical and asymmetrical keys, such as RSA key pairs, a message is sent via a third communication point, the so-called authentication device, which enables transmission of the message only once the sender and receiver and corresponding transmission of keys have been successfully identified to one another. The disadvantage of this teaching is that a third communications point, for instance in the form of a server, must be operated permanently.

International Patent Disclosure WO 2008 076 442 A1 teaches a method for randomizing the sequence of numbers on a number field, from which field a PIN is for instance input. The mechanical number field remains unchanged, but in inputting the user ignores the (standardized) digital labeling of the keys. Via a display on the screen, he is given a new distribution of the numbers 0 through 9, after which he inputs his PIN in the number field. This makes it more difficult for third parties to see the PIN surreptitiously. A disadvantage is that this security provision is ineffective if third-party spies also know the algorithm for randomizing the number sequences.

US Patent Application 2003/182558 A1 also shows a method for randomizing numbers in a number field, in which the numbers are additionally displayed on a touch-sensitive screen in a different geometry from the conventional keyboard arrangement. The disadvantage of the ineffective protection once the display algorithm is known, however, remains.

SUMMARY OF THE INVENTION

It is one object of the invention to overcome the disadvantages of the prior art and to disclose a method in which it is impossible, when surreptitiously viewing a number entered and with knowledge of one or more keys in the transmission of data, to change the identity of the sender and the content of the data.

According to Kerkhoff's Principle of 1883, a cryptosystem is secure, even if an attacker knows all the details of the system, as long as the keys remain secret (Kerkhoff's Principle [1883]: A cryptosystem should be secure even if the attacker knows all the details about the system, with the exception of the secret key).

The objects are attained according to one aspect of the invention directed to a method that includes the following steps:

i) generating and storing in memory an RSA key pair, comprising a first key (Sa) and a second key (Pa), for signing customer certificates in the center;

ii) generating and storing in memory two RSA key pairs for the customer device, comprising a third key of the customer device (Sc) and a fourth key of the customer device (Pc) as well as a first key encryption key (St) and a second key encryption key (Pt), the first key encryption key (St) and the second key encryption key (Pt) being suitable for secure transportation of the third key of the customer device (Sc);

iii) generating an encrypted key by encrypting the third key of the customer device (Sc), using the second key encryption key (Pt), and generating a customer certificate in the center by encrypting the customer-specific telephone number and the IMEI of the customer device and/or a customer number, using the fourth key of the customer device (Pc), and ensuing encryption using the first key (Sa) for signing customer certificates;

iv) transmitting the encrypted key and the customer certificate to the customer device;

v) sending the first key encryption key (St) to the customer device in response to a request by the customer device;

vi) decrypting the encrypted key using the first key encryption key (St) in the customer device, whereupon the third key of the customer device (Sc) is obtained;

vii) encrypting a randomized sequence of numbers in the center using the fourth key of the customer device (Pc);

viii) sending the encrypted randomized sequence of numbers to the customer device;

ix) decrypting the encrypted randomized sequence of numbers in the customer device, using the third key of the customer device (Sc);

x) encrypting a first PIN input at the customer device, using the third key of the customer device (Sc), to a ciphertext;

xi) sending the ciphertext and the customer certificate to the center;

xii) decrypting the ciphertext in the center, using the fourth key of the customer device (Pc), decrypting the first PIN input, and checking the customer certificate sent, using the customer certificate stored in memory in the center.

Preferably in an embodiment of the invention, the ciphertext is decrypted in the center, and that the certificate transmitted from the customer device is compared with the certificate stored in memory in the center, in order to verify the authenticity of the data.

It is also preferred in an embodiment of the method of the invention that the randomization of the randomized sequence of numbers is selected a single time by the customer upon initialization of the method and forwarded to the center.

Preferably, in an embodiment of the invention, the randomization of the randomized sequence of numbers is generated anew in the center for every transmission to the customer device.

Also preferably, in an embodiment of the method of the invention, the method includes the following further steps:
iii.a) generating a time stamp in the center;
iv.a) transmitting the encrypted key together with the time stamp to the customer device;
x.a) encrypting the first PIN input at the customer device together with the time key to a ciphertext.

A preferred embodiment of the method is distinguished by the following further steps:
x.b) encrypting a second PIN input at the customer device, using the third key of the customer device (Sc) to a ciphertext, in order to send a new PIN to the center; and
x.c) encrypting a third PIN input at the customer device, using the third key of the customer device (Sc), to a ciphertext, in order to confirm the new PIN.

Preferably in a feature of the invention, in addition to the first PIN input, the number input for a credit card number and/or an expiration of a credit card and/or a security code of a credit card is done and transmitted, together with the first PIN input, in encrypted form to the center.

Also preferably, in a feature of the method of the invention, in addition to the first PIN input, the number input of a product-specific number, such as the ISBN of a book title, is done and transmitted, together with the first PIN input, in encrypted form to the center.

BRIEF DESCRIPTION OF THE DRAWINGS

The invention will be described in further detail below in terms of an exemplary embodiment shown in the drawings. Shown are:

FIGS. 3a through 3d, various randomized sequences of numbers on a number field.

DETAILED DESCRIPTION OF THE DRAWINGS

Figure 1:
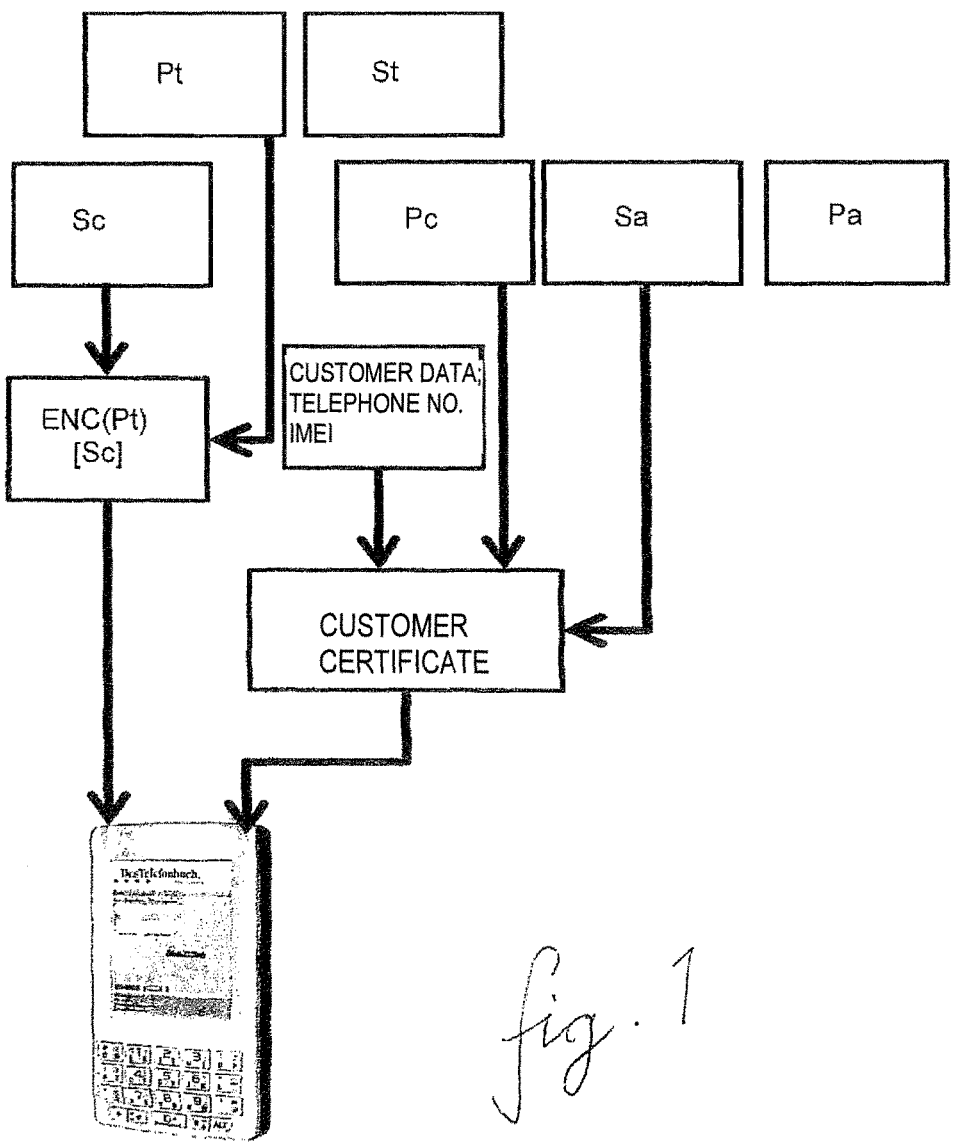
FIG. 1, a schematic illustration of the transmission of preparatory data to a customer device.

The method, which is also called a Finalogic system, is used by owners of mobile telephone and communications devices, for instance, so that they can perform legal transactions using secured processes. An example is ordering goods or services as well as access to protected information.

This consequently relates to the protection of numerical and/or alphanumeric data inputs in mobile telephone and communications devices against their being learned by unauthorized third parties.

Data inputs of this kind could be and are used in the method as follows:
defining, inputting and changing the PIN of the mobile telephone owner, and
inputting credit card data of the mobile telephone or communications device owner.

This also relates to method steps for checking the genuineness of the origin and content of data, transmitted by radio, from mobile telephone and communications devices, checking the identity of the sender, and preventing free legibility of sensitive information by unauthorized third parties, using cryptographic methods in real-time encryption for the action period.

For using the method of the invention, the customer, in other words an owner of a mobile telephone and communications device, hereinafter also called a customer device, must be registered either by telephone or via an Internet page, such as the Finalogic web page.

In doing so, the customer is also asked—in addition to the required personal data—for the type of device he has, such as an iPhone 4. It may also be the customer's wish already at that point to indicate the manner of payment, such as credit card, or the authorizing passwords for access to certain information services. It is important that the actual access data, which have an especially sensitive information character, not be made known in the system until a later time.

Finally, the customer is also asked for two data elements of his device:
i. his own telephone number (Phone#) and
ii. the 15-number IMEI—International Mobile Equipment Identifier, or hardware identification number—which is unique worldwide for every mobile telephone and communications device. Every customer can on his own read this number from his device using the key combination *#06#.

Alternatively or in addition to the IMEI, which is hard to protect very well and which in some cases is also issued multiply to many devices, the customer and the center can agree on a customer number. After that, the use of this customer number, instead of or in addition to the IMEI, will additionally enhance the security of the method of the invention.

Once this information has been input into the Finalogic system, the registration process is completed.

Now the cryptographic initialization process begins, for safeguarding the genuineness of the origin and the genuineness of electronically transmitted data, or in other words the method for securing data and safeguarding its origin. The Finalogic system operates using data elements of the PKI—Public Key Infrastructure, according to International Standard IEEE P1363.

Asymmetrical key pairs are used, which comprise a secret part (private key) and a nonsecret part (public key). The public key makes it possible for everyone to encrypt data for the owner of the private key, to check his digital signatures, or to authenticate him. Authentication is the identification of that particular person. The private key enables its owner to decrypt data that have been encrypted with the public key, to generate digital signatures, or to authenticate himself.

The following asymmetrical key pairs are used:
i. a first key for signing customer certificates Sa, the so-called secret PrivateKey(Finalogic);
ii. a second key Pa for signing customer certificates, the so-called public PublicKey(Finalogic);
iii. a first key encryption key St, the so-called secret PrivateKey(Trans);
iv. a second key encryption key, the so-called public PublicKey(Trans);
v. a third key of the customer device Sc, the so-called secret PrivateKey(Cust) of the customer, also called encryption key;
vi. a fourth key of the customer device Pc, the so-called public PublicKey(Cust) of the customer, also called tc;
vii. and the data elements that identify the customer device:
a. its own telephone number (Phone#) and
b. IMEI (hardware identification number) and/or the customer number.

The method proceeds as follows:
i. In the center (or also called data processing center), precisely one RSA key pair—Sa and Pa—is generated and stored in memory.

However, for each customer device, two RSA key pairs are newly generated and stored in memory: Sc and Pc as well as St and Pt. The transport key pair St-Pt is needed for secure transportation of the secret customer key Sc to the customer device. The center also, for each customer, generates the so-called customer certificate, or certificate for short. The requisite directions for calculating this are as follows: (1) encrypt your own Phone#, IMEI (hardware identification number) and/or the customer number, using the public customer key Pc: ENC (Pc) (Phone#, IMEI, KuNu); (2) encrypt the result of (1) using the Finalogic secret key Sa: ENC (Sa) (Phone#, IMEI, KuNu). An RSA key pair is a key pair that comprises one private key, which is used for decrypting or signing data, and one public key, with which encryption is done or signatures are checked. The private key is kept secret and can be calculated from the public key only with extremely major effort. The result is the certificate called "CustPK certificate" for that customer. In general, a certificate is a digital data set which confirms certain properties of persons or objects, and its authenticity and integrity can be checked by cryptographic methods. The digital certificate in particular includes the data required for checking it. FIG. 1 shows these steps and the transmission to the customer device, which is represented as a mobile phone. Together with a program suitable for the telephone and communications device type that the customer has (application, or app for short, also called telephone-service-provider-independent program application on mobile phone or communications device) or an equivalent program that can run using the device operating system, the following cryptographic elements encrypted secret customer key ENC (Pt) [PrivateKey (Cust) Sc] and
    customer certificate CustPK certificate
are transmitted by radio or wire.

The acceptance and storage in memory of the above programs and data files on the hard drive of the customer device requires the agreement of the customer.

With this program and these items of information, the following operations can now be performed by the customer:

Personalization:

This method for authentication is capable not only of furnishing unambiguous proof that a particular purchase order, for instance, was issued by the customer device with the unique customer number or the IMEI (hardware identification number), but can also uniquely identify the owner.

To do so, the customer chooses his personal PIN (Personal Identification Number) numerically/alphanumerically, which internationally is typically between 4 and 12 digits long; the customer himself is responsible for this. Only with this PIN can the customer utilize all the functions of his app.

When he inputs the PIN on mobile telephone and communications devices, the customer runs the risk of surreptitious third-party attempts to discover his PIN. Naturally, this is no different from other systems, which are equipped with similar protection mechanisms to protect personal authorizations. Therefore, the same rules as for protecting passwords apply here as well.

Figure 2:
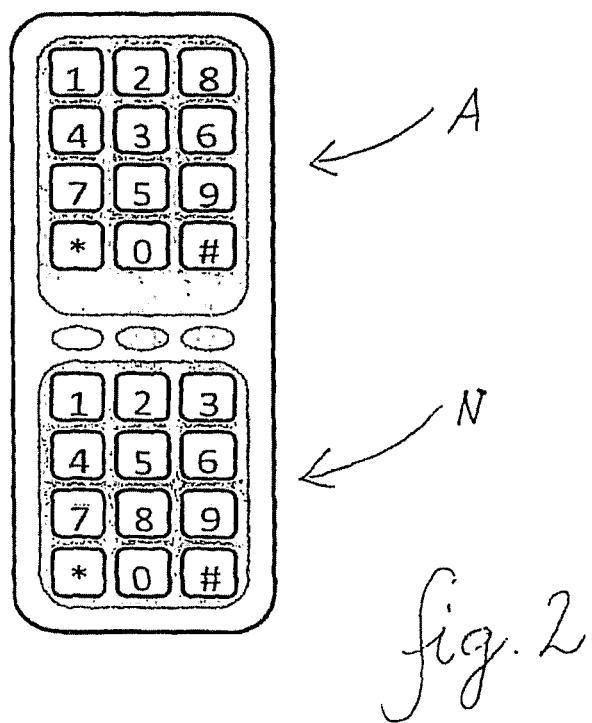
FIG. 2, a schematic customer device.

For this reason, inputting the PIN or other numbers in the method of the invention is done using the so-called randomized PIN, as shown in FIG. 2.

On the screen display A of the customer device, what is shown to the customer—instead of the usual order or arrangement of the numbers 1 through 9 and 0—is a random arrangement of these numbers, according to which the customer has to input his pin on the keypad N of his device.

Example 1 for numerical keypads:

The usual order of numbers is: 1234567890. Their arrangement looks like that shown in FIG. 3a. The randomized sequence of numbers for this PIN input shown in FIG. 3b is 6278015943. For the randomized input of the PIN "7510", the customer then presses the key sequence "3765".

Example 2 for numerical keypads:

This is another example for demonstrating the mode of operation of the randomized PIN method. The randomized sequence of numbers for inputting this PIN is 0768352419, as shown in FIG. 3c. For randomized inputting of the PIN "415597", the customer now presses the keys "896602".

The random directions for requesting numbers change every time a PIN or other numerical data (such as the credit card number) is entered, rather than after each digit.

The method for personalizing to secure the genuineness of the identity of the sender and user of the system proceeds as follows:

i. Immediately after the app is opened, the center requests the secret key decryption key St, in order to obtain the actual encryption key Sc of the customer.

ii. Next, the data processing center generates a new, arbitrary number arrangement, such as "9243605718", as shown in FIG. 3d, and encrypts it with the public customer key Pc in accordance with ENC(Pc)(CustData, "9243605718"), and this is then sent to the customer.

iii. The app decrypts the ciphertext obtained, using the secret customer key Sc DEC(Sc)(ENC(Pc)(CustData, "9243605718")).

On the screen, the new prescribed sequence appears in accordance with (ii) for the numeric keypad layout, as can be seen in FIG. 3d.

iv. The customer inputs his PIN in accordance with the displayed arrangement prescription and the result is encrypted using the encryption key of the customer Sc. The certificate is encrypted as well: ENC(Sc)(CustPK certificate, "397718"). That is sent to the center.

v. In the center, the ciphertext is decrypted suitably, and the PIN "415597" is stored in memory in the customer's master data, as long as long as the verification of the customer certificate CustPK certificate is also successful. The verification of the customer certificate guarantees the authenticity of the transmitted data and the identity of the origin.

The PIN change function proceeds as follows, because from this point on, the customer can at any time also select the "PIN change function":

i. Inputting the old PIN
ii. Inputting the new PIN
iii. Re-inputting the new PIN The essential advantage of this method is that, because the Finalogic system changes the prescribed number arrangement every time something is input, the ciphertexts of steps ii) and iii) differ in terms of values—even though the original values are identical.

Accordingly, this PIN change function in terms of security technology is superior to the conventional password change function, since in the Finalogic system, a so-called data reflection attack is successfully detected and repelled.

In practice, it has been found that customers do not notice the PIN as a sequence of numbers but rather as a graphic figure that the typing finger draws on the number block. Therefore, a constantly changing randomization of the numbers might be perceived as inconvenient and lead to inputting errors. To avoid that, the customer can alternatively select a concrete randomization of the numbers that is assigned user-specifically and transmitted to his device by the trusted server. Thus, the randomization of the numbers does not change after every individual use but, instead, remains the same for the individual customer. This has the surprising effect that inputting the PIN is still largely secure against being surreptitiously seen by third parties, yet at the same time the customer can and is allowed to notice a graphic figure that his typing finger makes as it enters the PIN. It is understood that at any time in the Web registration process, the user can have the trusted server create a new randomization or change to the system that has a constantly changing randomization of the numbers, if that appears better to him for security reasons.

Legal transactions are made as follows:
1. Course of a purchase transaction (example):
  i. Immediately after the opening of the app, the center requests the secret key decryption key St, in order to obtain the actual encryption key Sc of the customer.
  ii. In the data processing center, a time stamp is made, which is encrypted using the public customer key Pc and sent to the customer, ENC(Pc)(CustData, "2010-07-01/10:09:11, 571").
  iii. The app decrypts the ciphertext obtained using the secret customer key Sc DEC(Sc)(ENC(PC) (CustData, "2010-07-01/10:09:11, 571")).

For instance, if the customer wants the book "*Die Sieben Weltwunder*" ["The Seven Wonders of the World"], its ISBN code is encrypted, along with the customer certificate and the time stamp, using the secret customer key Sc, ENC(Pc) (CustData, "2010-07-01/10:09:11, 571", "ISBN 3-8094-1694-0"), and sent to the data processing center.

In the data processing center, the ciphertext is suitably decrypted, the customer certificate is checked, and if the time since the time stamp is not yet overly long either, the purchase order of the customer is sent to the appropriate merchant.

2. Course of a credit card payment (example):

If the customer as an option chooses payment by means of credit cards, then again our secured method is used by means of randomized sequence of numbers.

The individual transaction steps in detail are:
i. Immediately after the app is opened, the center requests the secret key decryption key St, in order to obtain the actual encryption key Sc of the customer.
ii. Next, the data processing center generates a new, arbitrary number arrangement, such as "9243605718", and encrypts it with the public customer key Pc ENC(Pc) (CustData, "9243605718"), which is then sent to the customer.
iii. The app decrypts the ciphertext obtained, using the secret customer key Sc in accordance with DEC(Sc)(ENC(Pc) (CustData, "9243605718").
iv. Input of the card number, the expiration date, and possibly a security code in accordance with the randomization prescription display; the outcome is encrypted with the encryption key of the customer Sc, ENC(Sc) (CustPK Certificate, "7255236666666669", "92/94", "999") and sent to the center.
v. In the center, the ciphertext is decrypted suitably and the customer certificate is checked, and if positive, a corresponding credit card payment is initiated.

Data protection is also secured, since in the system that uses the method of the invention, so-called HSMs (Host Security Modules) are used for data encryption and data decryption and for the key administration operations.

Such devices contain calculation and memory units that are optimized for cryptographic purposes and are protected from any attack or access from outside. The security system of these devices goes so far that in no way do they allow values or instructions to reach the outside in unencrypted form, and all the key values are erased as soon as any attempt to read it or sample the data is detected. Even the attempted removal of individual parts, and in fact even the unauthorized opening of the housing, results in the complete loss of memory; in concrete terms, each bit in the key memory is overwritten with "0".

For protecting personal data of our customers, Finalogic in data traffic with merchants uses either
  its own wire encryption key, if the opponent also has HSM modules, or
  at least SSL encryption to the data reception devices of the merchants, which must understand SSL.

The SSL (for Secure Socket Layer) encryption was developed by Netscape and RSA Data Security. The SSL protocol is intended to ensure that sensitive data when surfing the Internet, such as credit card information in online shopping, be transmitted in encrypted form. This is intended to prevent third party users from being able to read out or manipulate the data during the transmission. Moreover, this encryption method ensures the identity of a website.

In the encryption devices claimed, for instance from Finalogic, a reencryption operation takes place, using the customer's decryption key Pc and the merchant's encryption key.

HSMs that conform to security requirements must meet all the security requirements of International Standard FIPS 140-2 Level 4. FIPS stands for Federal Information Processing Standard and is the designation for publicly announced standards in the United States. FIPS 140 require that the data material not be capable of being read out in clear text under any circumstances or of being exploited in any other way.

This kind of procedure guarantees our customers complete protection of their personal data during data processing by Finalogic.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for securing data and safeguarding the data origin, wherein the data are transmitted electronically encrypted from a customer device to a center, comprising the steps of:
  i) generating and storing in memory an RSA key pair, comprising a first key (Sa) and a second key (Pa), for signing customer certificates in the center;
  ii) generating and storing in memory two RSA key pairs for the customer device, comprising a third key of the customer device (Sc) and a fourth key of the customer device (Pc) as well as a first key encryption key (St) and a second key encryption key (Pt), the first key encryption key (St) and the second key encryption key (Pt) secures the transportation of the third key of the customer device (Sc) by keeping the third key secret in transportation;
  iii) generating an encrypted key by encrypting the third key of the customer device (Sc), using the second key encryption key (Pt), and generating a customer certificate in the center by encrypting the customer-specific telephone number and the IMEI of the customer device and/or a customer number, using the fourth key of the customer device (Pc), and ensuing encryption using the first key (Sa) for signing customer certificates;

iv) transmitting the encrypted key and the customer certificate to the customer device;

v) sending the first key encryption key (St) to the customer device in response to a request by the customer device;

vi) decrypting the encrypted key using the first key encryption key (St) in the customer device, whereupon the third key of the customer device (Sc) is obtained;

vii) encrypting a randomized sequence of numbers in the center using the fourth key of the customer device (Pc);

viii) sending the encrypted randomized sequence of numbers to the customer device;

ix) decrypting the encrypted randomized sequence of numbers in the customer device, using the third key of the customer device (Sc);

x) encrypting a first PIN input at the customer device, using the third key of the customer device (Sc), to a ciphertext;

xi) sending the ciphertext and the customer certificate to the center;

xii) decrypting the ciphertext in the center, using the fourth key of the customer device (Pc), decrypting the first PIN input, and checking the customer certificate sent, using the customer certificate stored in memory in the center; and wherein decrypting the ciphertext occurs in the center and verifying the authenticity of the data occurs by comparing the certificate transmitted from the customer device with the certificate stored in the memory of the center.

2. The method of claim 1, wherein the transmission of the data from the center to the customer device and from the customer device to the center is radio or wire.

3. The method of claim 1, wherein the randomization of the randomized sequence of numbers is selected once by the customer and forwarded to the center.

4. The method of claim 1, wherein the randomization of the randomized sequence of numbers is generated anew in the center for every transmission to the customer device.

5. The method of claim 1, further comprising:
iii.a) generating a time stamp in the center;
iv.a) transmitting the encrypted key together with the time stamp to the customer device; and
x.a) encrypting the first PIN input at the customer device together with the time key to a ciphertext.

6. The method of claim 1, further comprising:
x.b) encrypting a second PIN input at the customer device, using the third key of the customer device (Sc) to a ciphertext, and sending a new PIN to the center; and
x.c) encrypting a third PIN input at the customer device, using the third key of the customer device (Sc), to a ciphertext, and confirming the new PIN.

7. The method of claim 1, wherein, in addition to the first PIN input, the number input for a credit card number or an expiration of a credit card or a security code of a credit card is transmitted, together with the first PIN input, in encrypted form to the center.

8. The method of claim 1, wherein, in addition to the first PIN input, the number input of a product-specific number is transmitted, together with the first PIN input, in encrypted form to the center.

9. The method of claim 8, wherein the number input of the product-specific number is an ISBN of a book title.

* * * * *